INVENTORS
E. J. KOSINSKY  P. H. WAGNER
S. J. KOLNER  R. R. GOINS
BY
Hudson & Young
ATTORNEYS United States Patent Office 3,008,940
Patented Nov. 14, 1961

3,008,940
WATER REMOVAL FROM POLYMERS
Paul H. Wagner, Edward J. Kosinsky, Robert R. Goins, and Samuel J. Kolner, all of Bartlesville, Okla., assignors to Phillips Petroleum Company, a corporation of Delaware
Filed Nov. 17, 1958, Ser. No. 774,421
7 Claims. (Cl. 260—88.2)

This invention relates to drying of thermoplastic polymers. In one of its aspects, this invention relates to drying of polymers of 1-olefins which are recovered from solution by dispersing in water.

It is known in the art to prepare thermoplastic materials by polymerizing unsaturated monomers to form high molecular weight normally solid thermoplastic polymers. Such polymers are useful for forming various objects such as by extrusion, injection molding, vacuum forming, and the like. Such polymers are frequently formed in the presence of hydrocarbon diluent or solvent. The polymer can then be separated from the hydrocarbon diluent by spraying or otherwise mixing the polymer and diluent in water and stripping or flashing the hydrocarbon out. The polymer, if in solution, precipitates out and in any case, the polymer forms a slurry in the water. The polymer is then recovered by draining the excess water off and thereafter drying the polymer after which the polymer can be formed into pellets by melting and extruding as strands and chopping into pellets. This type extrustion will be referred to herein as melt extrusion. The polymer as recovered from the water will ordinarily contain 15 to 40 or more weight percent water, some of which is not readily removed by drying with heat alone since a portion is frequently entrapped in the polymer. The polymer should be dried to a moisture content of not more than 7 weight percent and preferably not more than 3 percent for further processing, e.g., melt extrusion.

It has been found that the moisture content of a polymer wet with water can be lowered to a suitable level by masticating such as by extruding the polymer through a series of dies and draining freed water intermediate each masticating stage. However, conveying the polymer between stages and draining water therefrom also presents a problem since the fine particles tend to be carried out by the water and are lost or even plug the water drain lines, e.g., if the water is recycled. The polymer as recovered in water slurry frequently has an apparent low bulk density and consequently requires large conveyor capacity or machine capacity in subsequent operations. The wet mastication of polymer to free it of water compacts the polymer and thereby increases the capacity of a given piece of handling equipment such as the feed screw to a melt extruder. It would, therefore, be desirable to have a method of squeezing water from a thermoplastic material, separating the water thus squeezed without the loss of polymer, and reducing the total water content to not more than 7 weight percent.

It is an object of this invention to provide an improved method of removing moisture from thermoplastic materials.

Another object of this invention is to provide a comparatively rapid and efficient method of lowering the moisture content of thermoplastic material which is wet with water.

Still other objects, features, and advantages of this invention will be obvious to those skilled in the art having been given this disclosure.

According to this invention, a polymer associated with at least 8 weight percent liquid is squeezed or masticated in at least two steps, intermediate said steps, polymer is conveyed up an incline and liquid freed by said steps drains to a liquid level maintained at the lower level of said incline.

The polymer to be treated by the method of this invention is any thermoplastic composition containing at least 8 weight percent free water. These polymers will have generally been recovered from the reaction medium by spraying into and admixing with water. Polymer recovered from such systems will generally contain at least 12 weight percent water; however, two or more masticating steps will ordinarily be required for polymers associated with as little as 8 percent water. For example, Green in U.S. Patents 2,401,754 and 2,537,130 discloses the recovery of polymers from solution by spraying into a steam stripping tank and subsequently slurrying the polymer in water. U.S. Patent 2,401,754 discloses polymers of isoolefins and copolymers of isoolefins and diolefins prepared with a Friedel-Crafts type catalyst sprayed into a steam stripper and the polymer removed in a water slurry. U.S. Patent 2,537,130 discloses a similar method of recovering isobutylene copolymers. In the copending application of Robert G. Wallace, filed February 3, 1958, and having a Serial No. 712,908, a process is disclosed wherein polymers of 1-olefins in a hydrocarbon diluent are dispersed in water under conditions wherein the diluent and water are maintained in liquid phase and the polymer precipitated. Polymers recovered from such processes are wet with water and often contain water entrapped in the solidified polymer. While the method of this invention is particularly applicable to polymers recovered from solution by dispersing same in water, it is applicable to free polymers from water generally. In the preparation of rubbers from conjugated dienes or copolymers of same, e.g., butadiene-styrene rubbers, the polymer is prepared in aqueous medium and is coagulated by admixing with aqueous acid solutions resulting in a rubber water slurry. Examples of thermoplastic polymers include styrene resins such as polystyrene and butadiene-styrene copolymers; vinyl resins such as polyvinyl chloride and polyvinylacetate; cellulosic resins such as Celluloid, acetate and acetate-butyrate esters, nitrocellulose, and ethylcellulose; polymers of acrylic and methacrylic acids and their derivatives such as vinylacrylate and methacrylates; polyesters; polyamides; silicones; polyfluorocarbons; epoxy resins; isoolefinic polymers such as styrene-isobutylene, and other copolymers of isoolefins and substituted styrenes; copolymers of isoolefins and diolefins such as isobutylene-butadiene copolymers; and the like. In particular, this invention is applicable to polymers of 1-olefins, preferably mono-1-olefins which have from 2 to 8 carbon atoms per molecule. Examples of such 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-heptene, and the like. Homopolymers or copolymers of such 1-olefins can be used. More preferably, the polymer will be prepared from monomers comprising at least 50 weight percent ethylene with one or more such 1-olefins. These latter copolymers, as well as the homopolymers of ethylene, will be referred to herein as ethylene polymers. These 1-olefins can be polymerized alone, with each other, or with other monoolefins such as butene-2, pentene-2, isobutylene, and the like, however, the copolymer should be prepared from monomers comprising at least 50 weight percent of 1-olefins.

These polymers can be prepared by any method known to the art, e.g., solution polymerization, gas phase polymerization, liquid phase polymerization, and the like. These polymers can be prepared by the older well known high pressure polymerization methods such as described by Fawcett et al. in U.S. Patent 2,153,533. Preferably, these polymers will be prepared by one of the newer low pressure catalytic methods such as that described by Hogan et al. in U.S. Patent 2,825,721. Polyethylene prepared by the Hogan et al. method will ordinarily have a molecular weight in the range of 35,000 to 100,000 but can range as high as 200,000 or even higher. They will have a density in the range 0.95 to 0.97, e.g., approximately 0.96, and a crystallinity in the range 90 to 95 percent at ambient temperature as determined by nuclear magnetic resonance. The polymer ordinarily has a crystalline freeze point in the range 245 to 265° F. and a softening point of about 260° F. or higher. Polymers produced by this process have unsaturation which is preponderantly of the terminal vinyl and/or trans-internal structure. So-called "branched vinyl" unsaturation is substantially absent.

Another suitable, but less preferred and non-equivalent, method of preparing highly crystalline polymers is by use of various organometallic catalysts such as those disclosed by Karl Ziegler in Belgium Patent 533,362. Still another method of forming polymers of mono-1-olefins is to liquefy the monomer by low temperature and high pressure and to carry out the polymerization in liquid phase. In some of the methods mentioned, there may be no problem of liquid separation, however, should this polymer be admixed with a liquid necessitating a subsequent separation step, the process of this invention is applicable.

The wet polymer is freed of entrapped liquid by working and extruding the polymer through a die. While the die size can vary over a wide range so long as the polymer is actually worked or masticated as it is extruded, we have found a die having a diameter in the range $\frac{1}{16}$ to $\frac{5}{32}''$ and a length in the range ¾ to 2" is particularly effective.

Any suitable means for squeezing the polymer is operable, however, we have found that a pellet mill consisting of a rotatable cylindrical basket mounted horizontally and containing a plurality of holes or dies therein and rollers mounted to rotate in said basket to force the polymer through the dies is an especially efficient and relatively inexpensive means for practicing this invention. Thermoplastic polymers are frequently pelleted by melt extruding same into strands and chopping into pellets. These melt extruders can handle polymer containing up to 3 percent moisture with some handling up to 7 percent and, therefore, it is desirable to reduce the moisture content of the wet polymer to this percent moisture content as a maximum. The melt extruders are frequently limited in their capacity by the apparent density of the feed. The method of this invention has the additional advantage of densifying the polymer and, therefore, increasing the capacity of the melt extruder.

We have found that in general, each pass of the mill will reduce the water percentage of a well drained polymer by approximately one-half, and to obtain a suitable feed for a melt extruder, 2 mills are required for a water content in the range 8 to 15 weight percent and 3 mills for a water content over 15 weight percent, e.g., generally in the range 15 to 30 weight percent.

This invention will be further described with reference to the drawing in which.

Figures 1, 2:
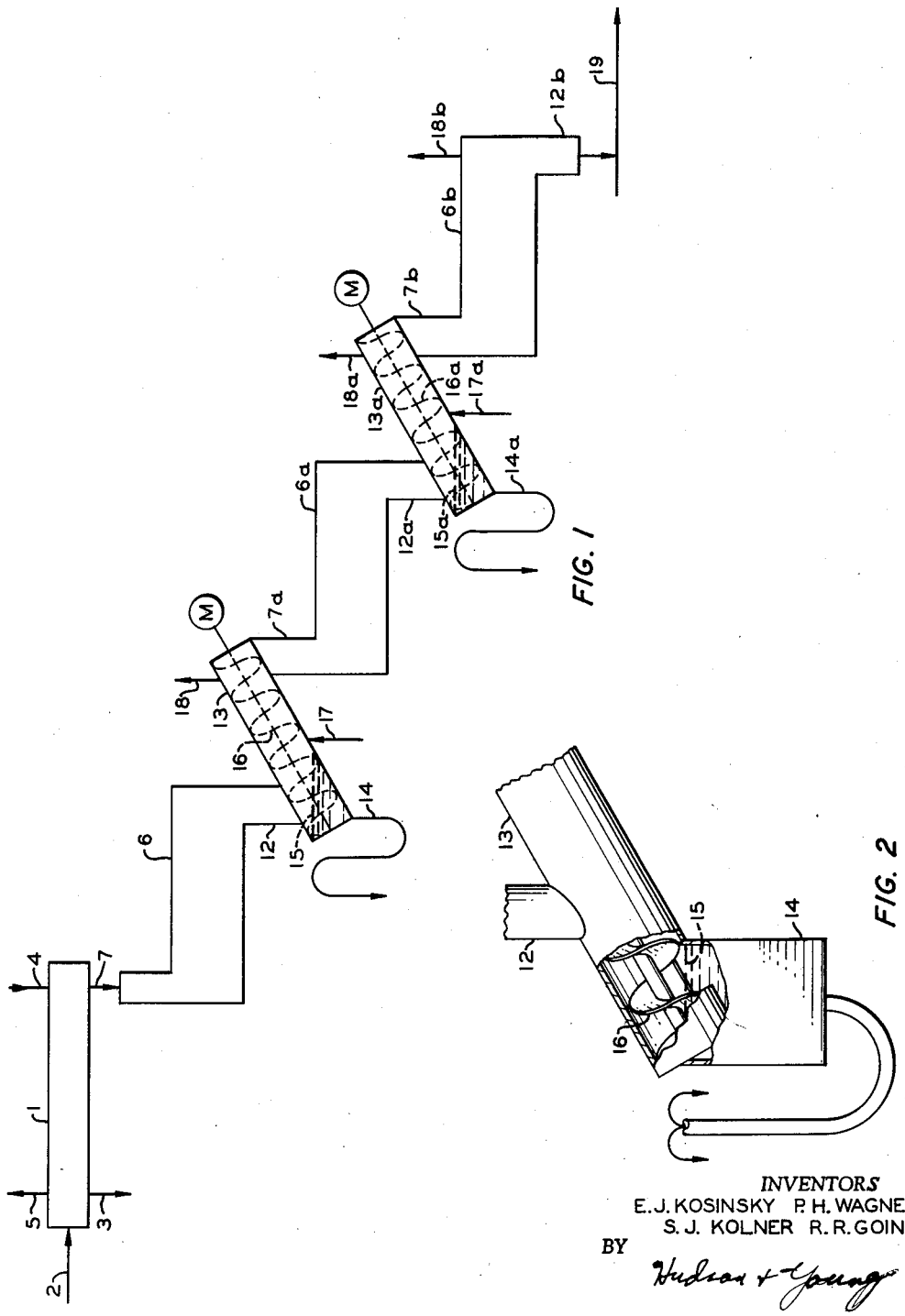
FIGURE 1 is a schematic representation of the process of this invention.
FIGURE 2 is a schematic illustration of one means for removing freed water and transferring polymer between mills.
Figure 3:
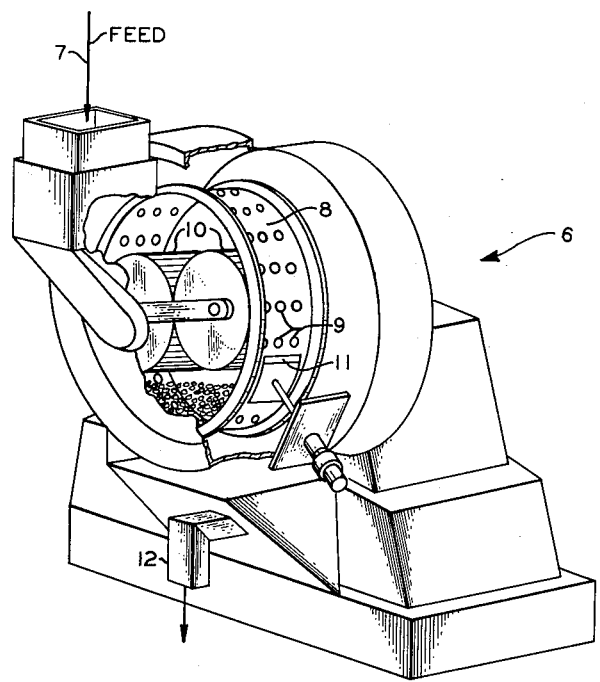
FIGURE 3 is an elevation of the cross-section of a suitable mill for the process of this invention.

Referring now to the drawings, a wet polymer as recovered from a water slurry is passed to zone 1 via conduit 2. In this zone, surface water is removed such as by a screen and residual hydrocarbons can be removed by a stripping gas. Liquid can be removed via conduit 3. Stripping gas is admitted via conduit 4 and removed via conduit 5. The stripping gas is shown flowing countercurrent to polymer flow, however, this gas flow, if used, can be concurrent. In any case, polymer containing 15–30 percent water is passed to the first pellet mill 6 via conduit 7. This pellet mill, as shown in more detail in FIGURE 3, comprises a basket 8 having a plurality of die holes 9 in its circumferential shell. Within basket 8 are rollers 10 which compact and force the polymer through the die 9 of basket 8 as the mill rotates. Mounted outside basket 8 is knife 11 which breaks the extruded material off and the resulting pellets are removed via conduit 12 to auger lift 13. At the lower level of lift 13 there is a U tube 14 which holds the liquid level at 15. Any polymer which may be carried down by the water will float and be picked up by worm 16 in the incline 13. Means 17 is provided for introducing a stripping gas, if desired, to the auger lift 13 and conduit 18 is provided for removal of said gas. It is, of course, within the scope of this invention to use countercurrent flow of stripping gas rather than the concurrent flow as shown. The stripping gas serves to evaporate moisture and also to cool the polymer to prevent melting of the polymer in the next pellet mill. The polymer, having been drained of free water now passes via conduit 7a to pellet mill 6a which is the same type as mill 6 and the repelleted material passes via conduit 12a to inclined auger 13a of the same type as 13 and on to mill 6b. The polymer, after being reduced to the desired degree of dryness, i.e., passed through the desired number of pellet mills, is removed via conduit 19 to storage or further processing as desired.

To illustrate how the water content of a polymer can be reduced by the method of this invention, a number of runs were made wherein an ethylene polymer prepared in cyclohexane solution and in the presence of a chromium oxide containing catalyst was treated by extrusion through a pellet mill of the type previously described. In each case, the polymer was recovered from solution by admixing the polymer solution with water under conditions wherein the water and cyclohexane remained in liquid phase until the polymer precipitated and then the cyclohexane was flashed off in a steam stripping zone.

*Example I*

In the first series of runs, an 0.2 melt index homopolymer of ethylene was treated by passing same several passes through the pellet mill. Two die sizes were used. The data are given below:

| | Rate, lbs./hr. | Temp., °F. | Wt. percent $H_2O$ |
|---|---|---|---|
| ⅛" diameter x 1½" long die: | | | |
| Feed | | 77 | 15.0 |
| 1st Pass | 951 | 148 | 6.6 |
| 2nd Pass | 1,500 | 176 | 3.3 |
| 3rd Pass | 1,305 | 197 | 1.1 |
| ³⁄₃₂" diameter x 1" long die: | | | |
| Feed | | 81 | 12.3 |
| 1st Pass | 1,280 | 162 | 6.2 |
| 2nd Pass | 1,324 | 189 | 2.1 |
| 3rd Pass | 1,106 | 210 | 0.4 |

*Example II*

A homopolymer of ethylene having a melt index of 0.44 was prepared with a catalyst mixture of chromium oxide-silica-alumina and nickel oxide-silica-alumina. The catalyst and diluent were removed and the polymer was treated as in Example I. The data are given in the table.

| | Rate, lbs./hr. | Temp., °F. | Wt. percent H₂O |
|---|---|---|---|
| ⅛″ diameter x 1½″ long Die: | | | |
| Feed | | 80 | 33.0 |
| 1st Pass | 757 | 148 | 7.4 |
| 2nd Pass | 1,780 | 158 | 6.3 |
| 3rd Pass | 1,830 | 172 | 3.5 |
| 4th Pass | 1,630 | 190 | 1.3 |
| 3/32″ diameter x 1″ long Die: | | | |
| Feed | | 74 | 21.9 |
| 1st Pass | 1,264 | 142 | 9.1 |
| 2nd Pass | 1,360 | 165 | 5.9 |
| 3rd Pass | 1,200 | 172 | 2.6 |
| 4th Pass | 1,090 | 188 | 0.5 |

*Example III*

In this run a copolymer prepared from 70 weight percent ethylene and 30 weight percent butene in the feed was prepared with the catalyst system of Example I. The product had a melt index of 0.9 and a density of 0.937. The data are given below.

| | Rate, lbs./hr. | Temp., °F. | Wt. percent H₂O |
|---|---|---|---|
| ⅛″ diameter x 1½″ long Die: | | | |
| Feed | | 77 | 28.5 |
| 1st Pass | 625 | 138 | 9.3 |
| 2nd Pass | 1,146 | 153 | 5.4 |
| 3rd Pass | 1,460 | 167 | 3.0 |
| 4th Pass | 966 | 180 | 1.2 |
| 3/32″ diameter x 1″ long Die: | | | |
| Feed | | 76 | 20.9 |
| 1st Pass | 823 | 138 | 11.3 |
| 2nd Pass | 1,260 | 155 | 5.5 |
| 3rd Pass | 1,490 | 168 | 2.7 |
| 4th Pass | | | 0.7 |

*Example IV*

In this series of runs, a homopolymer of ethylene prepared by the catalyst system of Example I and having a melt index of 5 is treated as above. The data are given below.

| | Rate, lbs./hr. | Temp., °F. | Wt. percent H₂O |
|---|---|---|---|
| ⅛″ diameter x ½″ long Die: | | | |
| Feed | | 78 | 12 |
| 1st Pass | 995 | 168 | 5.1 |
| 2nd Pass | 1,245 | 182 | 2.6 |
| 3rd Pass | 1,080 | 211 | 0.9 |
| 3/32″ diameter x 1″ long Die: | | | |
| Feed | | 78 | 12.7 |
| 1st Pass | 1,440 | 157 | 5.5 |
| 2nd Pass | 1,280 | 180 | 2.5 |
| 3rd Pass | 1,332 | 201 | 0.8 |

From the above examples, it can be seen that water content of wet polymers can be lowered to obtain a suitable feed for an extractor-extruder by extruding same through a plurality of mills. The work of extruding is converted to heat as is shown by the temperature of the product from each pass. Both homo- and copolymers having melt indices from 0.2 to 5 were suitably dried by the extrusion treatment. In the above runs, the feed bulk density wet varied from 13 to 30 lbs./ft.³ and the bulk density of the final product varied from 28 to 33 lbs./ft.³. It can, therefore, be seen that the process prepares a substantially uniform bulk density product.

It is within the scope of the invention to utilize different sized die holes in each pellet mill in series. This is desirable in many cases because the optimum hole size depends on such factors as the moisture content of the polymer, and the temperature of the polymer.

We claim:
1. A process for reducing the water content of a thermoplastic polymer associated with at least 8 weight percent water, said process comprising squeezing said polymer at a temperature below the softening temperature of said polymer through a series of dies, passing the resulting polymer and freed water after at least one extrusion to an auger lift zone to separate water from said polymer, maintaining a water level at the lower level of said auger lift zone, conveying the polymer up an incline in said auger lift zone, draining free water from said polymer in said auger lift zone, and again squeezing the polymer.

2. The process of claim 1 wherein the polymer to be treated contains at least 15 weight percent water, there are at least three dies in the series and there is an auger lift zone between each pair of dies.

3. The process of claim 2 wherein the thermoplastic polymer is a polymer of an aliphatic 1-olefin of 2 to 8 carbon atoms.

4. The process of claim 3 wherein the thermoplastic polymer is polyethylene.

5. The process of claim 3 wherein the thermoplastic polymer is a copolymer of ethylene and butene.

6. In the removal of water from a thermoplastic polymer having at least 8 weight percent water associated therewith by squeezing at a temperature below the softening temperature of said polymer through dies in at least two stages, the improvement of conveying the resulting polymer and freed water between said stages to a water separation zone and then up an incline to drain free water from the polymer and maintaining a water level at the lower level of said incline.

7. A process for reducing the water content of a thermoplastic polymer which comprises squeezing a thermoplastic polymer associated with at least 8 weight percent water at a temperature below the softening temperature of said polymer through a series of dies, passing the resulting polymer and freed water after at least one squeezing to a water separation zone and then passing wet polymer up an incline and draining free water from the polymer in said incline and maintaining a constant water level at the lower level of said incline.

References Cited in the file of this patent

UNITED STATES PATENTS

| 992,629 | Akins | May 16, 1911 |
| 2,731,452 | Field et al. | Jan. 17, 1956 |
| 2,869,728 | Wallen | Jan. 20, 1959 |
| 2,944,047 | Schutze et al. | July 5, 1960 |